July 3, 1962

E. F. MANGIS 3,042,018

STONE FACING MACHINE

Filed Aug. 17, 1959

Elmer F. Mangis
INVENTOR.

July 3, 1962  E. F. MANGIS  3,042,018
STONE FACING MACHINE
Filed Aug. 17, 1959  3 Sheets-Sheet 2

Elmer F. Mangis
INVENTOR.

BY Clarence A. O'Brien
and Harvey B. Jacobson
Attorneys

July 3, 1962

E. F. MANGIS 3,042,018

STONE FACING MACHINE

Filed Aug. 17, 1959

Elmer F. Mangis
INVENTOR.

United States Patent Office 3,042,018
Patented July 3, 1962

3,042,018
STONE FACING MACHINE
Elmer F. Mangis, Gossett Road, Frankfort, Ind.
Filed Aug. 17, 1959, Ser. No. 834,176
11 Claims. (Cl. 125—23)

This invention relates in general to new and useful improvements in the stonecutting art, and more specifically seeks to provide a novel stone facing machine.

After stone has been cut to approximately the desired size and shape, it must be provided with a face. At the present time this is accomplished by hand. Although skilled stone masons can rapidly face stone, since the facing operation must be done by hand, it is obvious that the facing of the stone is still relatively slow and expensive.

It is therefore the primary object of the invention to provide a novel stone facing machine which will automatically face a stone which has been placed within the machine, and which machine will operate at a relatively high rate as compared to the manual facing of stones.

Another object of the invention is to provide a stone facing machine which includes a conveyor assembly which will feed stones at a predetermined rate and will support the stones in position for being faced by cutters disposed alongside the conveyor whereby as the stones pass the cutters, the cutters will automatically face the stones.

Another object of the invention is to provide a stone facing machine which includes a pair of opposed cutterheads each having at least one individual cutter or chisel operating in opposed relation, and conveyor means for feeding stones between the cutterheads, transversely of the direction of operation of the cutterheads and in timed relation of the cutterheads so that as the stone moves transversely of the cutterheads, it is automatically faced by a rapid chipping action of the cutterheads.

A further object of the invention is to provide a novel stonecutting machine which is readily adjustable so that one machine will receive different sizes of stone and will face the various sizes of stones.

Another object of the invention is to provide a machine for facing stone, the machine including an upper conveyor and a lower conveyor, the two conveyors having opposed straight runs between which stone to be faced is placed, the straight runs moving in the same direction so as to move a stone between the two conveyors, and a cutter associated with each of the conveyors for operation in timed relation to the operation of the conveyors to chip the face of the stone and properly face the same, the individual cutterheads being mounted for movement in unison with their respective conveyors whereby the conveyors and cutterheads may be spaced apart in required distances to receive stones of various thicknesses.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
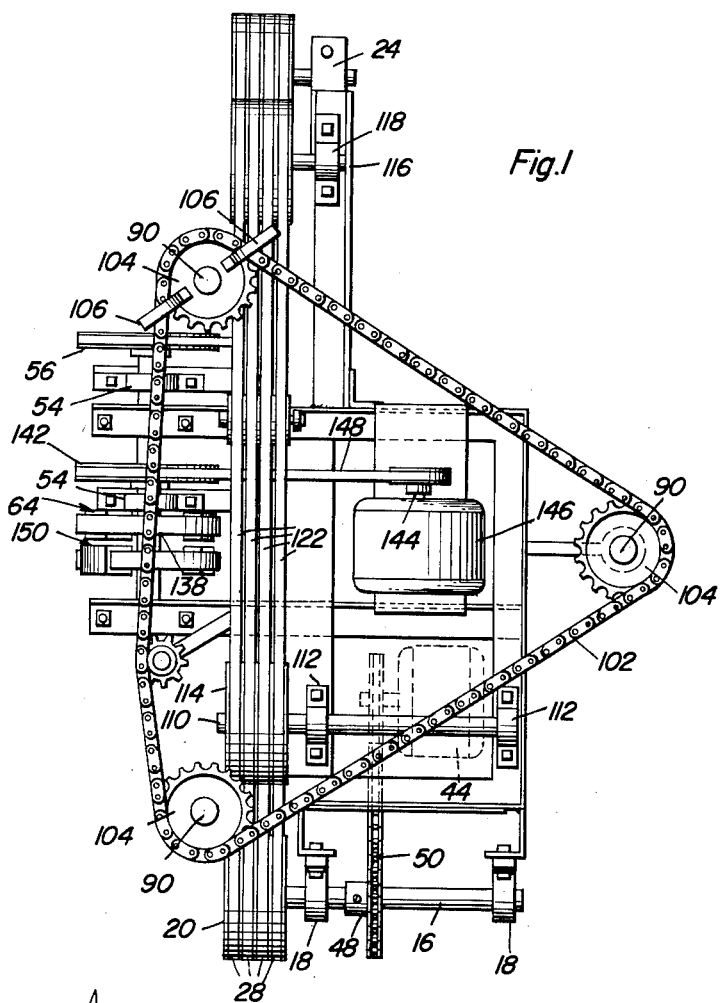
FIGURE 1 is a plan view of the stone facing machine and shows generally the details thereof.

Referring now to the drawings in detail, it will be seen that a preferred form of the invention is referred to in general by the reference numeral 10. The stone facing machine 10 includes a base frame 12 which is of the desired structural arrangement. An endless conveyor, generally referred to by the numeral 14 is supported by an upper portion of the base frame 12, the endless conveyor 14 being disposed generally forwardly of a major portion of the base frame 12. The endless conveyor 14 includes a drive shaft 16 which is suitably journaled in bearings 18 (FIGURE 1) carried by the base frame 12. A plurality of pulleys 20 disposed closely adjacent each other are secured to one end of the drive shaft 16. An idler shaft 22 is rotatably journaled in a bearing 24 (FIGURE 1) remote from the drive shaft 16. The idler shaft 22 carries a plurality of closely adjacent pulleys 26 which are aligned with the pulleys 20.

A plurality of endless belts 28 are entrained over the pulleys 20 and 26, there being one endless belt to each of the pulleys 20, 26. The endless belts 28 are tensioned by tensioning pulleys 30 carried by an intermediate portion of the base frame 12 and engaging a lower portion of the endless belt 28. The pulleys 30 are mounted on a shaft 32 supported by a hanger 34.

The pulleys 20 and 26 are horizontally aligned so that the endless belt 28 has an upper straight horizontal run 36. The horizontal run 36 is supported by a plurality of support pulleys 38 which are mounted on shafts 40. Further, the horizontal run 36 is supported by a plurality of rollers 42 disposed on opposite sides of the support pulleys 38. It is to be noted that the support pulleys 38 and the rollers 42 are disposed slightly above the pulleys 20 and 26, so that the horizontal straight run 36 is disposed slightly above the normal position which would be assumed by the endles belt 28.

A suitable drive motor 44 is mounted in the lower portion of the base frame 12 and is provided with a drive sprocket 45. The drive shaft 16 is provided with a driven sprocket 48, FIGURE 1, and a chain 50 is entrained over the sprockets 46 and 48 to connect together the two.

A cutterhead shaft 52 extends along the front of the base frame 12 generally parallel to the plane of the conveyor 14. The cutterhead shaft 52 is journaled in bearings 54 carried by the base frame. A pulley 56 is mounted on one end of the cutterhead shaft 52, the pulley 56 being aligned with a drive pulley 58 carried by a suitable drive motor 60 mounted in the lower portion of the base frame 12. A drive belt 62 is entrained over the pulleys 56 and 58 to drivingly connect the two.

A cutterhead, generally referred to by the numeral 64 is carried by the cutterhead shaft 52 remote from the pulley 56. The cutterhead 64 includes a wheel on disk 66 having a central bore 68 for receiving the cutterhead shaft 52. A second bore 70 is formed in the wheel 66 adjacent the periphery thereof. A cutter or chisel unit 72 is mounted on the wheel 66. The cutter or chisel unit 72 includes a U-shaped mounting bracket 74 and a cutter or chisel 76 having a cutting edge 78. The mounting bracket 74 is passed over the wheel 66 and a pin 80 is passed through aligned bores 82 in the mounting bracket 74 and the bore 70 to pivotally connect the cutter or chisel unit 72 to the wheel 66. A cotter key 84 retains the pin 80 in place.

Figure 4:
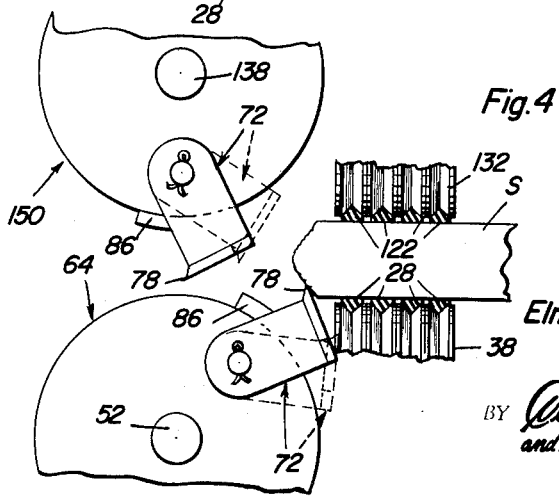
FIGURE 4 is an enlarged fragmentary view showing the manner in which a stone is held by the conveyors and the operation of the cutterheads thereon.

A transverse stop bar 86 is welded to the periphery of the wheel 66 forwardly of the mounting bracket 74 in a position to be engaged by the mounting bracket 74 and thus retain the cutter or chisel unit 72 in proper angular relationship with respect to a stone S which is to be faced. This is best illustrated in FIGURE 4.

Figure 2:
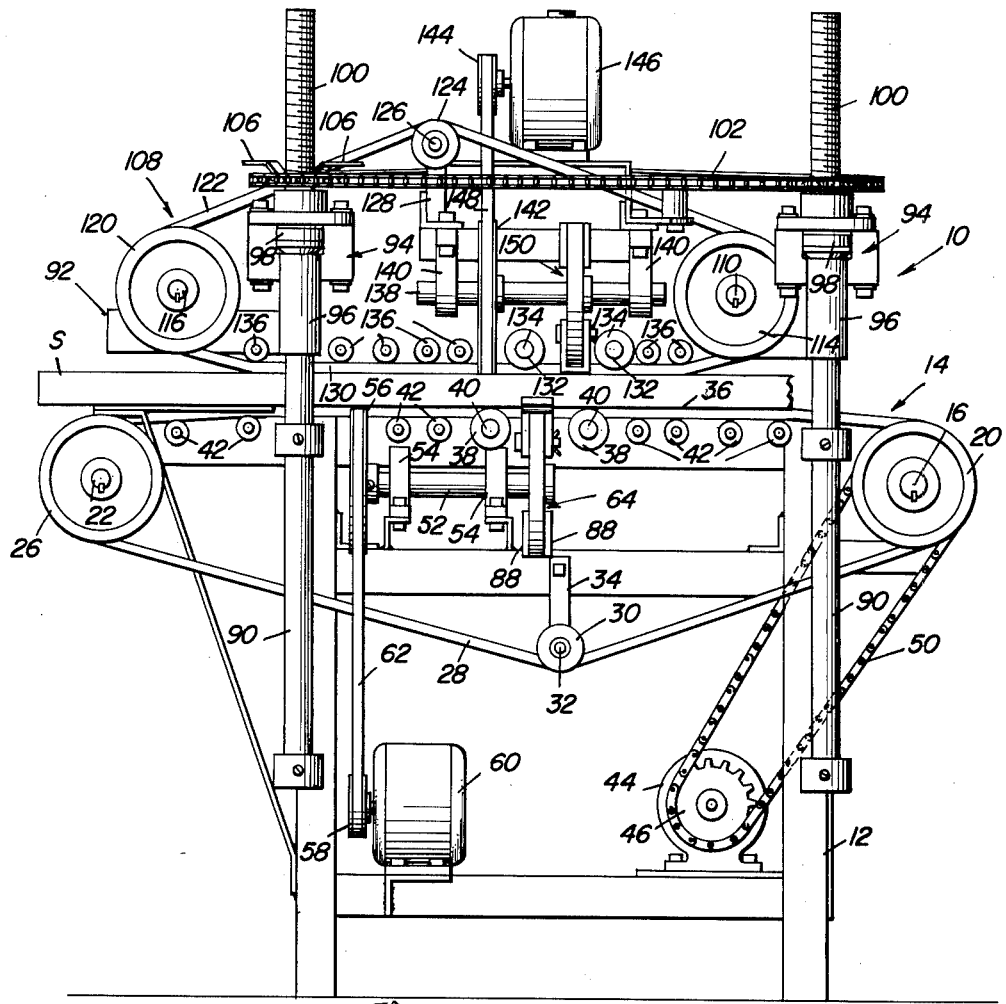
FIGURE 2 is an elevational view of the stone facing machine and shows the specific relationship between the two conveyors and the relative positions of the two cutterheads.
Figure 5:
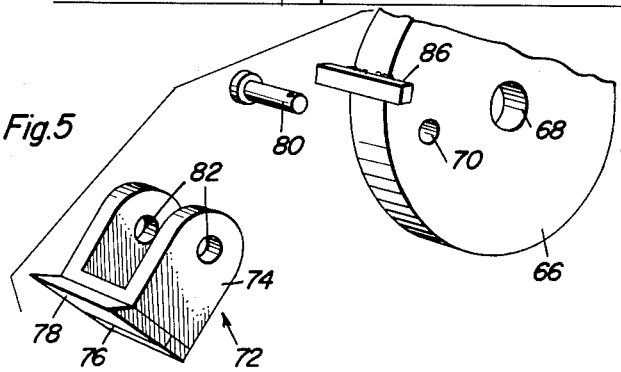
FIGURE 5 is an enlarged fragmentary exploded perspective view showing generally the details of one of the cutterheads.
Figure 3:
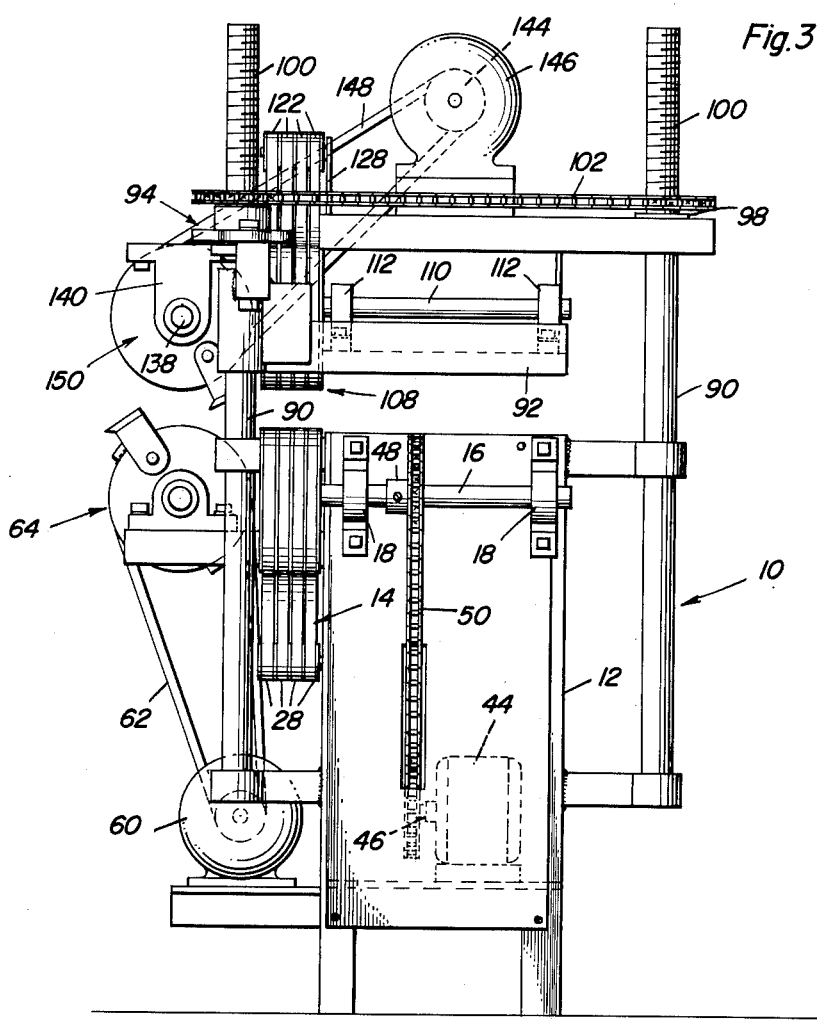
FIGURE 3 is an end view of the stone facing machine and shows the general arrangement of the various drive means.

It is to be understood that the wheel 66 will carry at least one cutter or chisel unit 72. If only one cutter or chisel unit 72 is mounted on the wheel 66, then it is necessary that the wheel be provided with a suitable counterbalance which is in the form of counterbalance plates 88 best illustrated in FIGURE 2. If two or more cutter or chisel units 72 are mounted on the wheel 66, the counterbalance plates 88 may be dispensed with.

Three support shafts 90 extend upwardly from the base frame 12 in a triangular relation, two of the support shafts 90 being disposed forwardly of the base frame and one of the support shafts 90 being disposed rearwardly of the base frame, as is best illustrated in FIGURE 1. A vertically adjustable upper frame 92 is carried by the supports 90 for vertically adjustable positioning. The upper frame includes a plurality of support units 94, there being one support unit 94 for each of the supports 90. Each support unit 94 includes a sleeve 96 which is telescoped over its respective support 90 so as to guide the upper frame 92 for vertical movement only. Also, each support unit 94 includes a rotatable nut 98 which is threadedly engaged on a threaded upper portion 100 of an associated one of the supports 90. In order that the upper frame 92 may remain level and parallel to the base frame 12 at all times, the nuts 98 are interconnected by a sprocket and chain assembly which includes a chain 102 and a sprocket 104 connected to each of the nuts 98. Thus the individual nuts 98 are rotated in unison at the same rate. One of the nuts 98 is manually driven by means of grip members 106 secured to its sprocket.

A second endless conveyor, generally referred to by the numeral 108, is carried by the upper frame 92. The endless conveyor 108 includes a shaft 110 which is suitably journaled in bearings 112 carried by the upper frame 92, FIGURE 1. A plurality of individual pulleys 114 are mounted on the forward portion of the shaft 110. A second shaft 116 is disposed at the opposite side of the upper frame 92 from the shaft 110 and is suitably journaled in a bearing 118 carried by the upper frame 92, as is best shown in FIGURE 1. A plurality of pulleys 120 are carried by the shaft 116 in alignment with the pulleys 114. A plurality of endless belts 122 are entrained over the pulleys 114 and 120. The endless belts 122 are tensioned by pulleys 124 which engage upper portions of the endless belts 122. The pulleys 124 are carried by a shaft 126 supported by a bracket 128 adjustably secured to the upper frame 92.

The endless conveyor 108 has a straight lower horizontal run 130 which opposes the horizontal run 36 and which is in parallel relation thereto. The straight run 130 is backed up by a plurality of back-up pulleys 132 mounted on shafts 134. On opposite sides of the back-up pulleys 132 are back-up rollers 136. In this manner upward deflection of the straight run 130 is prevented. It is to be noted that the straight run 130 is disposed below the normal path which the endless belts 122 would normally assume.

A cutterhead shaft 138 is disposed forwardly of the upper frame 92 and generally parallel to the conveyor plane. The endless shaft 138 is supported by suitable bearings 140 mounted on the upper frame 92. A pulley 142 is mounted on the shaft 138 for driving the same. The pulley 142 is aligned with the pulley 144 of a drive unit 146 which is mounted on the upper part of the upper frame 92. A drive belt 148 is entrained over and connects together the pulleys 142 and 144.

A second cutterhead 150 is carried by the shaft 138. The cutterhead 150 is of identical construction to the cutterhead 64 and need not be described in detail. However, as is best illustrated in FIGURE 4, the cutterhead 150 is turned around from the cutterhead 64 so that the cutting edges 78 of the cutter of chisel unit 72 move in the same direction. In this manner the cutterhead 64 faces the lower portion of the stone S and the cutterhead 150 faces the upper portion of the stone S.

In the operation of the stone facing machine 10, the straight runs 36 and 130 of the conveyors 14 and 108, respectively are adjusted to be spaced apart the desired distance to properly grip a stone S. The stone S is then fed into the right end of the machine 10 and moves from right to left. The stone S is gripped by the individual conveyor belts 28 and 122 in the manner best illustrated in FIGURE 4. Although only the conveyor belts 28 are driven, because of the friction contact with the stone S, the conveyor belts 122 are driven in unison.

As the stone S approaches the cutterheads 64 and 150, it is first engaged by the cutterhead 150 which is disposed slightly in advance of the cutterhead 64, the cutterheads 150 and 64 being disposed slightly out of alignment to avoid any contact between the cutter or chisel unit 72 thereof. The cutter or chisel unit 72 of the cutterhead 150 will engage the upper portion of the stone S and begin to face the same. As the stone S advances, the cutter or chisel unit 72 of the cutterhead 64 will engage the lower portion of the face of the stone S and begin to face the same. It is to be understood that the cutterheads 64 and 150 will rotate at such a speed that the face of the stone S will be completely faced even though it is moving transversely of the cutterheads 64 and 150. At this time it is pointed out that the cutterhead 64 is disposed intermediate the pulleys 38 and the cutterhead 150 is disposed intermediate the pulleys 132 to assure the proper supporting of the stone S at the time of the facing operation.

Figure 6:
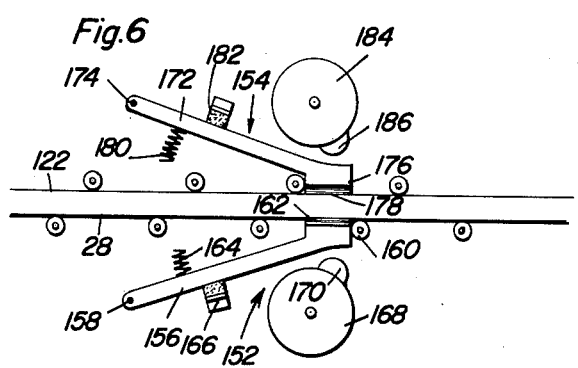
FIGURE 6 is a schematic view showing a modified form of cutterhead.

A modified form of cutterhead assembly is illustrated in FIGURE 6. These cutterheads are referred to in general by the reference numeral 152 and 154. The cutterhead 152 is disposed lowermost and includes an elongated support arm 156 which is mounted on a pivot 158 for movement in a vertical plane. The support arm 156 carries a cutter or chisel 160 having a cutting edge 162 facing upwardly. The support arm 156 is urged downwardly by a spring 164 and downward swinging thereof is limited by a resilient stop member 166.

Associated with the support arm 156 is a cam wheel 168 carrying a hammer element 170. The hammer element 170 engages the support arm 156 in the area of the cutter or chisel 160 as the cam wheel 168 rotates and forces the support arm 156 upwardly so that the cutter or chisel 160 will engage and face the stone S being fed through the machine.

The cutterhead 154 is substantially identical with the cutterhead 152 and includes a support arm 172 mounted on a pivot 174. The support arm 172 carries a cutter or chisel 176 having a cutting edge 178. The cutting edge 178 opposes the cutting edge 162.

The support arm 172 is normally urged upwardly in a counter-clockwise direction by a coil spring 180. Upward movement of the support arm 172 is limited by a resilient stop member 182. The oscillation of the support arm 172 and its cutter or chisel 176 is effected by a cam wheel 184 carrying a cam or hammer 186 which engages the support arm 182 in the vicinity of the cutter or chisel 176 to periodically force the same downwardly. The downward movement of the cutter or chisel 176 results in the facing of the upper part of the face of a stone S.

It is to be understood that the cutterheads 152 and 154 may be placed in the cutterheads 64 and 150. In the operation of the machine utilizing the cutterheads 152 and 154, the stone S will be supported by the conveyor belts 28 and 122 in the same manner as described above with respect to the cutterheads 64 and 150.

From the foregoing, it will be readily apparent that there has been devised a machine which will rapidly face stone automatically. Furtheer, because the machine may be readily vertically adjusted, the machine is readily adaptable to stones of various sizes.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A stone facing machine comprising a conveyor assembly for feeding a stone to be faced, at least one facing head disposed adjacent to and at one side of said conveyor for facing a stone as the stone is moved past said facing head, said facing head including a rotatable carrier journalled for rotation about an axis extending along the direction of movement of said conveyor assembly, at least one cutter on said carrier, said cutter including a cutter arm pivotally secured to said carrier for movement about an axis spaced from and extending substantially parallel to the axis of rotation of said carrier, the other end of said arm normally projecting beyond the peripheral edges of said carrier and provided with a cutting tool having a cutting edge facing in the direction of rotation of said carrier, stop means carried by said carrier and engageable with said cutter arm to establish a limit position of swinging movement of the outer end of said arm in the direction of rotation of said carrier to a position spaced rearwardly, relative to the direction of rotation of said carrier, of that position which would normally be assumed by the free end of said arm by centrifugal forces acting thereon upon rotation of said carrier at operating speed.

2. A stone facing machine comprising a conveyor assembly for feeding a stone to be faced, at least one facing head disposed adjacent to and at one side of said conveyor for facing a stone as the stone is moved past said facing head, said facing head including a rotatable carrier journalled for rotation about an axis extending along the direction of movement of said conveyor assembly, at least one cutter on said carrier, said cutter including a cutter arm pivotally secured to said carrier for movement about an axis spaced from and extending substantially parallel to the axis of rotation of said carrier, the other end of said arm normally projecting beyond the peripheral edges of said carrier and provided with a cutting tool having a cutting edge facing in the direction of rotation of said carrier, said stone facing machine including a pair of opposed facing heads, stop means carried by said carriers and engageable with the corresponding arms to establish limit positions of swinging movement of the outer ends of said arms in the direction of rotation of the corresponding carrier to positions spaced rearwardly, relative to the direction of rotation of the corresponding carrier, of those positions which would normally be assumed by the free ends of said arms by centrifugal forces acting thereon upon rotation of said carriers at operating speed.

3. The combination of claim 2 including means for adjustably positioning one of said cutter heads relative to the other.

4. The combination of claim 2 wherein said conveyor assembly includes a pair of separate conveyors having opposed ends substantially parallel runs for clampingly engaging stones therebetween.

5. The combination of claim 4 wherein at least one of said conveyors includes a series of transversely aligned rollers defining one of said parallel runs.

6. The combination of claim 2 wherein said conveyor assembly includes a pair of separate conveyors having opposed ends substantially parallel runs each supported from the corresponding head against movement away from the other for clampingly engaging stones therebetween, said stone facing machine including a base unit and an upper unit, one of said endless conveyors carried by each of said units, and adjustable support means for adjustably positioning an upper unit relative to said base unit for accommodating stones of different thicknesses.

7. The combination of claim 6 wherein one of said facing heads is carried by each of said units.

8. The combination of claim 2 wherein said conveyor assembly includes a pair of separate conveyors having opposed ends substantially parallel runs each supported from the corresponding head against movement away from the other for clampingly engaging stones therebetween, said stone facing machine including a base unit and an upper unit, one of said endless conveyors carried by each of said units, and adjustable support means for adjustably positioning said upper unit relative to said base unit for accommodating stones of different thicknesses, said adjustable support means including a plurality of threaded standards, nut elements rotatably carried by said upper unit and threaded on said standards.

9. The combination of claim 8 including means for rotating said nut elements in unison.

10. The combination of claim 2 wherein said conveyor assembly includes a pair of separate conveyors having opposed ends substantially parallel runs each supported from the corresponding head against movement away from the other for clampingly engaging stones therebetween, said endless conveyors each including a plurality of endless belts.

11. The combination of claim 2 wherein said stop means limiting rotation of the outer ends of said arms in the direction of rotation of the corresponding carrier establish limit positions with the cutting edge of each arm lying on a radius of the axis of rotation of said carrier coinciding with the axis of rotation of the arm.

References Cited in the file of this patent

UNITED STATES PATENTS

| | | |
|---|---|---|
| 2,731,961 | De Ponseele | Jan. 24, 1956 |
| 2,777,438 | Mangis | Jan. 15, 1957 |
| 2,801,626 | Potter et al. | Aug. 6, 1957 |
| 2,809,625 | Gendron et al. | Oct. 15, 1957 |
| 2,867,204 | Arvay | Jan. 6, 1959 |

FOREIGN PATENTS

| | | |
|---|---|---|
| 622,110 | Germany | Nov. 19, 1935 |
| 932,216 | France | Mar. 16, 1948 |